United States Patent Office 3,435,073
Patented Mar. 25, 1969

3,435,073
5-(N-BENZYL-N-LOWER ALKYLAMINOALKYL-ENE)-5H-DIBENZO[a,d]CYCLOHEPTENES
Claude I. Judd, Mequon, and Alexander E. Drukker and John H. Biel, Milwaukee, Wis., assignors to Colgate-Palmolive Company, New York, N.Y., a corporation of Delaware
No Drawing. Continuation-in-part of application Ser. No. 301,658, Aug. 12, 1963. This application Apr. 19, 1966, Ser. No. 543,539
Int. Cl. C07c 87/40; A61k 27/00
U.S. Cl. 260—570.8
2 Claims

ABSTRACT OF THE DISCLOSURE

The compounds are 5-(N-benzyl-N-loweralkylaminoalkylene)-5H-dibenzo[a,d]cycloheptenes useful as intermediates in the preparation of 5-(N-methylaminoalkylene)-5H-dibenzo[a,d]cycloheptenes which are antidepressant agents.

---

This application is a continuation-in-part of our copending application Ser. No. 301,658, filed Aug. 12, 1963 now U.S. Patent No. 3,258,488, which is in turn a continuation-in-part of our application Ser. No. 21,610, filed Apr. 12, 1960, now abandoned.

This invention relates to novel chemical compounds and processes of preparing the same. More particularly, this invention is concerned with novel basic dibenzsuberene derivatives and processes of producing such compounds.

According to the present invention there are provided novel basic 5H-dibenzo[a,d]-cycloheptene derivatives of the formula

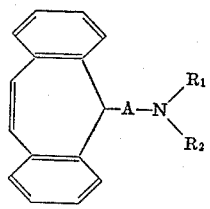

and acid addition and quaternary ammonium salts thereof, wherein A is a lower straight or branched alkylene advisably of 2 to 5 carbons, and $R_1$ and $R_2$ are the same or different members of the group consisting of hydrogen, lower alkyls such as methyl, ethyl, propyl, isopropyl and butyl, aryl groups and particularly phenyl, aralkyl groups and particularly phenyl-lower alkyl groups including benzyl, phenylethyl and phenylisopropyl, cycloalkyl groups and particularly cyclohexyl and cyclopentyl, cycloalkyl-lower alkyl groups such as cyclo-hexyl-methyl and cyclopentyl-ethyl and groups in which

represents a heterocyclic amino group such as morpholino, pyrrolidino, piperidino, 1,2,3,4-tetrahydroquinolino, 1,2,3,4-tetrahydroisoquinolino, N-lower alkyl-piperazino groups such as N-methylpiperazino, N-(hydroxy-lower alkyl)piperazino groups such as 4-(beta-hydroxyethyl)-piperazino and N-aralkylpiperazino groups such as 4-(methylphenethyl)-piperazino and the quinuclidino group.

The compounds of this invention in which $R_1$ and $R_2$ are both substituents can be produced by reacting an alkali metal salt of 5H-dibenzo[a,d]cycloheptene with the appropriate disubstituted aminoalkylhalide or di-substituted aminoalkyl para-toluenesulfonate. This process can be represented as follows:

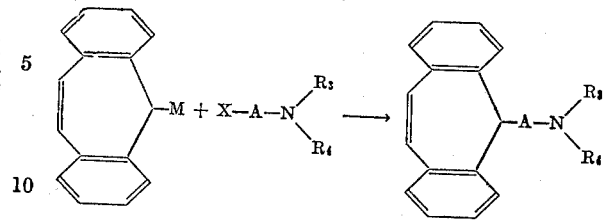

wherein M is an alkali metal and particularly lithium, sodium or potassium, X is a reactive halogen and particularly chlorine, bromine or iodine or the para-toluenesulfonate group. A has the significance previously assigned and $R_3$ and $R_4$ have the same meaning as $R_1$ and $R_2$ but neither is hydrogen.

The alkali metal 5H-dibenzo[a,d]-cycloheptene salt used as a reactant can be prepared by reacting 5H-dibenzo[a,d]-cycloheptene with an alkali metal alkyl or aryl compound such as butyl lithium, phenyl lithium, propyl sodium and butyl potassium. The reaction is readily effected by bringing the reactants together in an inert anhydrous liquid reaction medium such as ethyl ether, xylene, toluene, Tetralin, cumene and tetrahydrofuran, and compatible mixtures of such solvents. The reaction can be effected at room temperature or elevated temperatures, depending on the reactivity of the alkali metal compound used in the process. The reaction is substantially complete in 1 to 4 hours. Following termination of the reaction the product can be isolated, if desired, but this is ordinarily not done since it can be used as present in the reaction mixture in the next step.

Reaction between the alkali metal salt of 5H-dibenzo[a,b]-cycloheptene and the disubstituted aminoalkyl halide can be effected by bringing the reactants together in a suitable inert high boiling liquid reaction medium such as dioxane, toluene, xylene, ethyl ether, Tetralin, cumene and tetrahydrofuran. The reaction mixture from the formation of the alkali metal 5H-dibenzo[a,d]-cycloheptene can be used as the reactant and solvent source to which the appropriate aminoalkyl halide reactant can be added. The reaction proceeds at room temperature although slightly elevated temperatures can also be used. About 3 to 20 hours is generally adequate to substantially complete the reaction. After the reaction is terminated, the product can be recovered by filtering the reaction mixture, distilling off the solvent and fractionally distilling the high boiling base in vacuo.

Among the disubstituted aminoalkyl halides which can be used in the reaction are dimethylaminoethyl chloride, diethylaminoethyl bromide, diphenylaminopropyl chloride, dibenzylaminoethyl chloride, dicyclohexylaminoethyl bromide, piperidinopropyl chloride, morpholinoethyl bromide, pyrrolidinoethyl chloride, 4-methylpiperazinoethyl chloride, quinuclidinobutyl chloride, N-methyl-N-benzylaminoethyl chloride and N-phenyl-N-benzylaminoethyl bromide.

Some of the compounds which are produced according to this invention are:

5-(N-benzyl-N-methylaminoethyl)-5H-dibenzo[a,d]-cycloheptene,
5-(2-dimethylaminoethyl)-5H-dibenzo[a,d]-cycloheptene,
5-(3-dibenzylaminopropyl)-5H-dibenzo[a,d]cycloheptene,
5-(4-diphenylaminobutyl)-5H-dibenzo[a,d]cycloheptene,
5-(2-piperidinoethyl)-5H-dibenzo[a,d]-cycloheptene,
5-(4-methylpiperazinopropyl)-5H-dibenzo[a,d]-cycloheptene,
5-(quinuclidino)-5H-dibenzo[a,d]-cycloheptene, and
5-[4-(beta-hydroxyethyl)-piperazinopropyl]-5H-dibenzo[a,d]-cycloheptene.

The compounds of the formulae

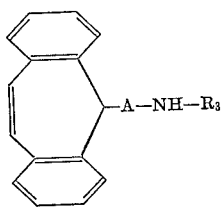

in which A and $R_3$ have the significance previously assigned but $R_3$ is not benzyl can be produced by subjecting the compounds of the formula

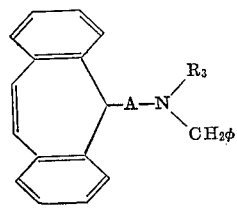

in which A and $R_3$ have the assigned significance, but $R_3$ is not benzyl, and $\phi$ is phenyl, to catalytic cleavage of the benzyl group. Similarly, the compounds

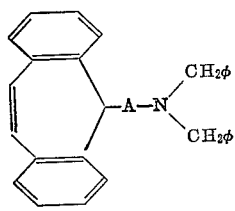

can be subjected to catalytic cleavage to form the compounds

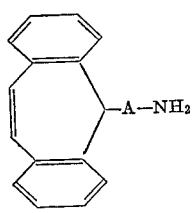

in which A and $\phi$ have the assigned significance.

The catalytic reductive cleavage of the benzyl group is readily effected by adding the appropriate N-mono or dibenzyl dibenzosuberene derivative, either as the free base or the acid addition salt, to a solvent such as water or a lower alcohol, adding a catalyst such as palladium, and hydrogen under pressure, as up to about 100 p.s.i. The hydrogenation proceeds quickly and its progress can be measured by the hydrogen uptake. When the required quantity of hydrogen is consumed, the reaction is terminated. The reaction mixture is worked up in the conventional manner.

The compounds of the formula

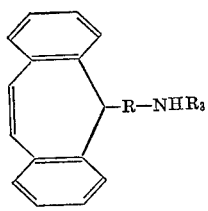

in which A and $R_3$ have the significance previously assigned but $R_3$ is not benzyl may alternatively be produced by reacting a compound of the formula

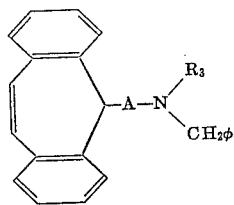

with a chloroformate having the formula

in which $R_5$ is a lower alkyl such as methyl, ethyl and propyl; phenyl or phenyl-lower alkyl such as benzyl and phenethyl, to produce a compound of the formula

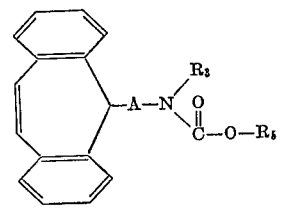

and subjecting said compound to hydrolytic cleavage.

In the first step of the process the chloroformate and the N-benzyl dibenzosuberene derivative are brought together in a suitable inert liquid reaction medium at a temperature which induces the reaction. Benzene, toluene, xylene and Tetralin are representative reaction media which may be used. Elevated temperatures and particularly temperatures at or about reflux are suitable for the reaction. After the reaction is terminated, the solvents can be removed and the resulting oil distilled to give the product in pure form.

Among the chloroformates which can be employed are methylchloroformate, ethylchloroformate, phenylchloroformate, benzylchloroformate and phenethylchloroformate.

The hydrolytic cleavage step is effected by bringing the N-carbo-$R_5$-oxy dibenzosuberene derivative into contact with a alkali hydroxide under conditions which effect hydrolysis of the carbo-$R_5$-oxy group. The reaction medium is desirably one in which the alkali carbonate, a byproduct of the reaction, is insoluble. Alcohols and glycols such as ethylene glycol are particularly useful reaction media. A particularly suitable alkali hydroxide is barium hydroxide; however, sodium hydroxide or potassium hydroxide may be employed.

After the hydrolysis is terminated, the reaction mixture can be diluted with water, filtered to remove the alkali carbonate, extracted with an immiscible solvent such as benzene and the benzene extracted with very dilute aqueous hydrochloric acid. The acid extracts are then made basic, the oil taken up in ether and the ether removed to give the product.

Some of the compounds produced in either of the above manners are:

5-(3-aminopropyl)-5H-dibenzo[a,d]cycloheptene,
5-(2-aminopropyl)-5H-dibenzo[a,d]cycloheptene,
5-(2-aminoethyl)-5H-dibenzo[a,d]cycloheptene,
5-(2-methylaminoethyl)-5H-dibenzo[a,d]cycloheptene,
5-(3-methylaminopropyl)-5H-dibenzo[a,d]cycloheptene, and
5-(2-phenylaminoethyl)-5H-dibenzo[a,d]cycloheptene.

Acid addition salts of the compounds of this invention can be produced by contacting the dibenzosuberene derivatives with a suitable inorganic or organic acid such as hydrochloric, sulfuric, phosphoric, maleic, benzoic, tartaric, succinic, fumaric, methane sulfonic, and citric acid in a suitable solvent such as methanol, ethanol, isopropanol, ethyl acetate and acetonitrile. The salts form readily at room temperature and can be separated by conventional methods.

These compounds, as the free bases and nontoxic acid addition salts thereof, are central stimulants and antispasmodic agents in animals. The compounds thus can be used in depression and mild gastrointestinal disturbances.

For obtaining the described activities the compounds can be administered in combination with a suitable pharmaceutical carrier and advisably in a unit dosage form such as a tablet or capsule. The oral route of administration is preferred.

The compounds of this invention can also be used as neutralizing agents and in the isolation of penicillin from fermentation broths.

The following examples are presented to illustrate the preparation of compounds within the invention.

EXAMPLE I 5-(3-dimethylaminopropyl)-5H-dibenzo[a,d,] cycloheptene

A 300 cc. three-neck round bottom flask was charged with a solution of 9.6 g. (0.05 mole) of dibenzosuberene in 75 cc. of tetrahydrofuran. The solution was covered with nitrogen, cooled in ice water and, while stirring, a solution of 32 cc. of butyllithium solution 15.4% (0.055 mole) in 50 cc. of ether was added dropwise in 15 min. A dark brown color developed and the solution was stirred for 4 hours at room temperature. Then there was added, in 35 min., a solution of 6.1 g. (0.05 mole) of 3-dimethylamino propylchloride in 30 cc. of ether. The dark color disappeared and LiCl began to precipitate. The solution was stirred for 9 hours at room temperature. The salt was filtered off, the solvent was removed by distillation and the residue was distilled without a column, using a free flame. Yield: 10.85 g., B.P. 130–180° C. (0.025 mm.).

*Analysis.*—Calcd. for $C_{20}H_{23}N$: N, 5.05%. Found: N, 4.07%.

8.8 g. of the crude base was converted to the hydrochloride. Yield: 8.9 g. After freeing the base from 8.8 g. of this hydrochloride, the maleate was prepared by dissolving the base in ether and adding one equivalent of maleic acid in ethanol-ether. Yield: 8.4 g., M.P. 137–138° C. After recrystallization from 50 cc. of ethanol, the yield was 7.4 g., M.P. 143–144° C.

*Assay.*—Calcd. for $C_{24}H_{27}NO_4$: N, 3.56%. Found: N, 3.58%.

EXAMPLE II

5-[3-(4-methylpiperazino)propyl]-5H-dibenzo[a,d] cycloheptene

To a cooled solution of 19.25 g. (0.1 mole) of dibenzosuberene in 150 cc. of tetrahydrofuran was added dropwise in 1 hour 66 cc. (0.11 mole) butyl lithium solution in 100 cc. of ether. The resulting dark solution was stirred at room temperature for four hours. A solution of 17.65 g. (0.1 mole) of N-(3-chloro)propyl-N′-methyl piperazine in 100 cc. ether was then added in one hour and the mixture stirred at room temperature for ten hours. After the addition of 50 cc. of water, the organic layer was separated, the solvent removed through distillation and the residue dissolved in 540 cc. 7% aqueous HCl. The acidic solution was washed with ether and made alkaline with KOH. The oily layer was extracted with ether, the ether dried over anhydrous potassium carbonate and the solvent was removed by distillation. The residue was distilled through a short column using an air condenser. The compound was obtained as a clear yellow glass-like material, B.P. 182° C. (0.06 mm.), yield 16.55 g. (50%).

*Analysis.*—Calcd. for $C_{23}H_{28}N_2$: N, 8.42%. Found: N, 8.22%.

The dihydrochloride was prepared in a mixture of ethanol and ether and was recrystallized from ethanol and ether. M.P. 262–264° C. (dec. foams).

*Analysis.*—Calcd. for $C_{23}H_{30}Cl_2N_2$: N, 6.90%; Cl, 17.51%. Found: N, 6.71%; Cl, 17.57%.

EXAMPLE III 5-(3-N-methyl-N-benzylaminopropyl)-5H-dibenzo[a,d] cycloheptene

To a cooled solution of 28.9 g. (0.15 mole) of dibenzosuberene in 225 ml. tetrahydrofuran was added dropwise 100 ml. (0.16 mole) butyl lithium solution in 200 ml. ethyl ether. After stirring for five hours at room temperature, 29.6 g. (0.15 ml.) 1-(N-methyl-N-benzylamino)-3-chloropropane in 100 ml. anhydrous ethyl ether was added dropwise. After stirring at room temperature for 12 hours, 50 ml. of water were added. The organic layer was separated and the solvent removed. The resulting residue was dissolved in 500 ml. benzene and extracted with 10% aqueous hydrochloric acid. The acid extract was made alkaline with potassium hydroxide, extracted with ether; and the ethereal extracts combined and dried. The solvent was removed in vacuo to yield a viscous oil which was fractionated to yield 36.9 g. (70%), B.P. 193–198° C. (0.1 mm.).

*Analysis.*—Calc. for $C_{26}H_{27}N$: C, 88.33%; H, 7.70%; N, 3.97%. Found: C, 88.56%; H, 7.78%; N, 3.70%.

EXAMPLE IV 5-(3-N-methyl-N-carbethoxyaminopropyl)-5H-dibenzo[a,d]cycloheptene A mixture of 32.7 g. (0.093 mole) of 5-(3-N-methyl-N-benzylaminopropyl) - 5H - dibenzo[a,d]cycloheptene, 11.2 g. (0.103 mole) of ethyl chloroformate and 80 ml. benzene were stirred and refluxed for 20 hours. After steam distillation the residue was dissolved in 500 ml. benzene, washed with dilute hydrochloric acid, washed with water and dried over anhydrous potassium carbonate. The solvent was removed in vacuo to yield 31 g. of yellow oil.

EXAMPLE V 5-(3-methylaminopropyl)-5H-dibenzo[a,d]cycloheptene

A mixture of 30 g. (0.0895 mole) of 5-(3-N-methyl-N-carbethoxyaminopropyl) - 5H - dibenzo[a,d]cycloheptene, 43.5 g. of barium hydroxide $8 \cdot H_2O$ and 340 ml. of ethylene glycol was stirred and refluxed for ten hours. The mixture was poured into 1000 ml. of cold water, the solid was removed by filtration and rinsed with benzene. The filtrate was extracted with benzene and the combined benzene layers were extracted with dilute HCl. The aqueous extract was cooled, made alkaline with KOH and extracted with ether. The ethereal extracts were dried over anhydrous potassium carbonate, filtered and taken to dryness to leave 19.5 g. of a cream colored oil which on distillation gave 15.1 g. (62%) of product, B.P. 163–164° C. (0.35 mm.). Hydrochloride.—The base (15 g., 0.056 mole) was dissolved in 500 ml. of dry ether and brought to pH 1.0 with ethereal HCl. The salt was recrystallized from ethanol and ether to yield 11 g. (64%) of product. M.P. 170–171° C.

*Analysis.*—Calcd. for $C_{19}H_{22}ClN$: C, 76.11%; H, 7.40%; N, 4.68%; Cl, 11.83%. Found: C, 76.19%; H, 7.45%; Cl, 12.06%; N, 4.77%.

EXAMPLE VI 5-(3-methylaminopropyl)-5H-dibenzo[a,d]cycloheptene

A solution of 1.689 g. of 5-(3-N-methyl-N-benzylaminopropyl)-5H-dibenzo[a,d]cycloheptene in 150 ml. of ethanol was hydrogenated at room temperature and atmospheric pressure in the presence of 650 mg. of 10% palladium on charcoal. The reduction was stopped when one equivalent of hydrogen was taken up, the catalyst was removed by filtration and the filtrate was concentrated in vacuo. The fraction isolated by gas chromatographic methods had an identical retention time with the compound prepared according to the previous example, and showed an absorption maximum in the ultra violet at 290 mµ, which is also identical to the spectrum of the product of the previous example. This maximum is absent in derivatives of 10,11-dihydro-5H-dibenzo[a,d]cycloheptenes.

We claim:
1. A compound of the formula

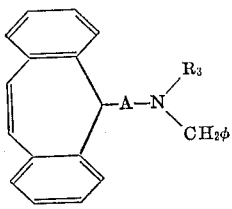

in which A is an alkylene of 2 to 5 carbon atoms, $R_3$ is lower alkyl and $\phi$ is phenyl.

2. 5-(N-benzyl - N - methylaminoethyl)-5H-dibenzo[a,d]-cycloheptene.

References Cited

UNITED STATES PATENTS

| | | | |
|---|---|---|---|
| 3,264,342 | 8/1966 | Schindler | 260—570.8 X |
| 3,309,404 | 3/1967 | Engelhardt | 260—556 |
| 3,324,170 | 6/1967 | Kollowitsch | 260—570.8 X |
| 3,372,196 | 5/1968 | Engelhardt | 260—570.8 |

OTHER REFERENCES

Protiva et al.: "Jour. Med. Chem.," vol. 4, pp. 411–15 (1961).

Winthrop et al.: "Jour. Org. Chem.," vol. 27, pp. 230–40 (1962).

ROBERT V. HINES, *Primary Examiner.*

U.S. Cl. X.R.

195—36; 260—239.1, 247, 268, 283, 293, 326.81, 456, 463, 471, 501.1, 501.21, 563, 567.6, 576, 583, 665; 424—248, 250, 258, 267, 274, 329, 330